(12) United States Patent
Lin (10) Patent No.: US 9,039,018 B1
(45) Date of Patent: May 26, 2015

(54) FOUR-WHEEL INDEPENDENT SUSPENSION SYSTEM FOR AN ELECTRIC WHEELCHAIR

(71) Applicant: Chung-Chuan Lin, Taichung (TW)

(72) Inventor: Chung-Chuan Lin, Taichung (TW)

( * ) Notice: Subject to any disclaimer, the term of this patent is extended or adjusted under 35 U.S.C. 154(b) by 0 days.

(21) Appl. No.: 14/249,797

(22) Filed: Apr. 10, 2014

(51) Int. Cl.
*B60G 11/18* (2006.01)
*B60G 11/20* (2006.01)
*B60G 3/12* (2006.01)
*A61G 5/04* (2013.01)
*B60G 11/24* (2006.01)
*A61G 5/10* (2006.01)

(52) U.S. Cl.
CPC *B60G 3/12* (2013.01); *A61G 5/045* (2013.01); *B60G 11/24* (2013.01); *A61G 2005/1078* (2013.01); *A61G 2005/1089* (2013.01); *A61G 2200/34* (2013.01)

(58) Field of Classification Search
USPC ............. 280/124.166, 124.107, 124.128, 280/124.129, 124.169, 304.1, 304.2, 5.514, 280/6.157, 6.159, 86.5; 180/65.51, 65.5; 267/273, 285; 56/15.8
See application file for complete search history.

(56) References Cited

U.S. PATENT DOCUMENTS

| | | | | |
|---|---|---|---|---|
| RE28,259 E | * | 12/1974 | Henschen | 267/279 |
| 5,411,287 A | * | 5/1995 | Henschen | 280/124.169 |
| 6,070,898 A | * | 6/2000 | Dickie et al. | 280/304.1 |
| 6,234,507 B1 | * | 5/2001 | Dickie et al. | 280/304.1 |
| 6,447,073 B1 | * | 9/2002 | Goettker | 301/127 |
| 6,905,130 B2 | * | 6/2005 | Few | 280/124.169 |
| 7,306,247 B2 | * | 12/2007 | Wu | 280/124.128 |
| 7,789,408 B2 | * | 9/2010 | Sloan et al. | 280/124.166 |
| 8,210,552 B2 | * | 7/2012 | Nance | 280/124.135 |
| 8,573,621 B1 | * | 11/2013 | Reynolds | 280/124.166 |
| 8,727,363 B1 | * | 5/2014 | VanDenberg et al. | 280/124.157 |
| 2008/0116660 A1 | * | 5/2008 | Nicholls | 280/286 |

* cited by examiner

*Primary Examiner* — Paul N Dickson
*Assistant Examiner* — Darlene P Condra
(74) *Attorney, Agent, or Firm* — Patent Office of Bang Shia (57) ABSTRACT

A four-wheel independent suspension system for an electric wheelchair includes a chassis, two front wheels each fixed to a front rod respectively, and two rear wheels each fixed to a rear rod respectively. The chassis includes a rail extending in a width direction of the chassis, each of the front and rear rods has one end connected to a square first connecting sleeve, in the first connecting sleeve is disposed a first shock absorber which includes a rectangular outer pipe, and a rectangular inner pipe disposed in and rotated degrees with respect to the outer pipe, the edges of the inner pipe are abutted against the inner surface of the outer pipe, between each of the edges of the inner pipe and the inner space of the outer pipe is disposed an elastic rubber, the inner pipe of each of the first shock absorbers is sleeved on the rail.

14 Claims, 7 Drawing Sheets

FOUR-WHEEL INDEPENDENT SUSPENSION SYSTEM FOR AN ELECTRIC WHEELCHAIR

BACKGROUND OF THE INVENTION

1. Field of the Invention

The present invention relates to an electric wheelchair, and more particularly to a four-wheel independent suspension system for an electric wheelchair.

2. Description of the Prior Art

As compared with the traditional manual wheelchair, an electric wheelchair is additionally provided with high performance drive device, intelligent control, battery and other components. Nowadays, the electric wheelchair has become an indispensable means of transport to elders and disabled people. However, the road surface that the mobility scooter runs is never always smooth. Therefore, to enhance sitting comfort, the mobility scooters must be equipped with shock absorbers which normally are in the form of a spring disposed between the seat and the chassis. However, the shock absorbing effect of the spring is not good since it only works in the height direction. Besides, the spring shock absorber is complicated in structure, costly to assemble, and requires a certain amount of height, which is not conducive to miniaturization of the mobility scooter.

The present invention has arisen to mitigate and/or obviate the afore-described disadvantages.

SUMMARY OF THE INVENTION

The primary objective of the present invention is to provide a four-wheel independent suspension system for an electric wheelchair, wherein all wheels of the wheelchair can be independently suspended from the chassis to improve shock absorbing effect.

To achieve the above objective, a four-wheel independent suspension system for an electric wheelchair in accordance with the present invention comprises: a chassis, two front wheels each fixed to a front rod respectively, and two rear wheels each fixed to a rear rod respectively. The four-wheel independent suspension system is characterized in that: the chassis is provided with a rail extending in a width direction of the chassis, each of the front rods and rear rods has one end connected to a first connecting sleeve which is square-shaped in cross section, in each of the first connecting sleeves is disposed a first shock absorber which includes a rectangular outer pipe, and a rectangular inner pipe disposed in and rotated degrees with respect to the outer pipe, so that edges of the inner pipe are abutted against the inner surface of the outer pipe, between each of the edges of the inner pipe and the inner space of the outer pipe is disposed an elastic rubber, the inner pipe of each of the first shock absorbers is sleeved on the rail, so that the front and rear wheels are independently suspended from the chassis via the connecting sleeves and the first shock absorbers.

Preferably, each of the first connecting sleeves includes a U-shaped frame and bolts, the U-shaped frame is sleeved on a corresponding one of the first shock absorbers and then fixed by the bolts and nuts.

Preferably, the front rods are connected to the first shock absorbers that are disposed in the first connecting sleeves that are connected to the front rods and extend outward and forward in an inclined manner, and the rear rods are connected to the first shock absorbers that are disposed in the first connecting sleeves that are connected to the rear rods and extend downward and backward in an inclined manner.

Preferably, the four-wheel independent suspension system for the electric wheelchair further comprises a safety rod, at a rear end of the chassis is disposed a hollow pipe which extends downward and backward, the hollow pipe has a top close end, inside the hollow pipe is disposed an elastic member, the safety rod is partially inserted in the hollow pipe and abutted against the elastic member.

Preferably, the hollow pipe is provided with two aligned slots in two opposite sides thereof, the safety rod is provided with an engaging protrusion on each of two opposite sides, and the engaging protrusions are engaged in the slots.

Preferably, the elastic members are springs.

Preferably, the safety rod is provided at a lower end thereof with two first wheels which are located at two sides of the safety rod.

Preferably, a second connecting sleeve is disposed at the rear end of the chassis, and in the second connecting sleeve is disposed a second shock absorber which is structurally the same as the first shock absorber, at two ends of an inner pipe of the second shock absorber are sleeved two suspension arms, and at lower ends of the suspension arms is fixed a second wheel.

With the first connecting sleeves and the first shock absorbers, each of the rear wheels can be independently suspended from the chassis, unlike the conventional suspension, in which springs are disposed between the seat and the chassis. When the rear wheels run on a pump road surface, the first shock absorbers will bounce up and down together with the rear wheels to reduce shock transmission between the rear wheels and the chassis, preventing shock from being transmitted to the seat via the chassis, so that the user on the seat will feel less shock. Besides, the structure of the first shock absorbers can produce shock absorbing effect in all directions, unlike the springs that produce shock absorbing effect only in the vertical direction. The first shock absorbers also take much less space than the springs, which is conducive to miniaturization of the mobility scooter.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
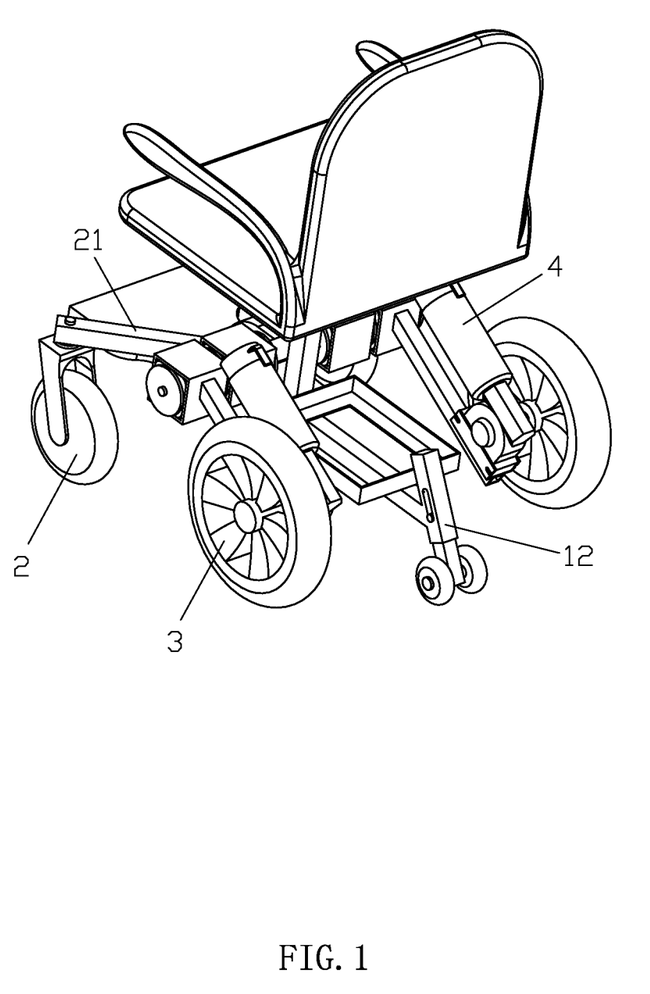
FIG. 1 shows a four-wheel independent suspension system for an electric wheelchair in accordance with the present invention.
Figure 2:
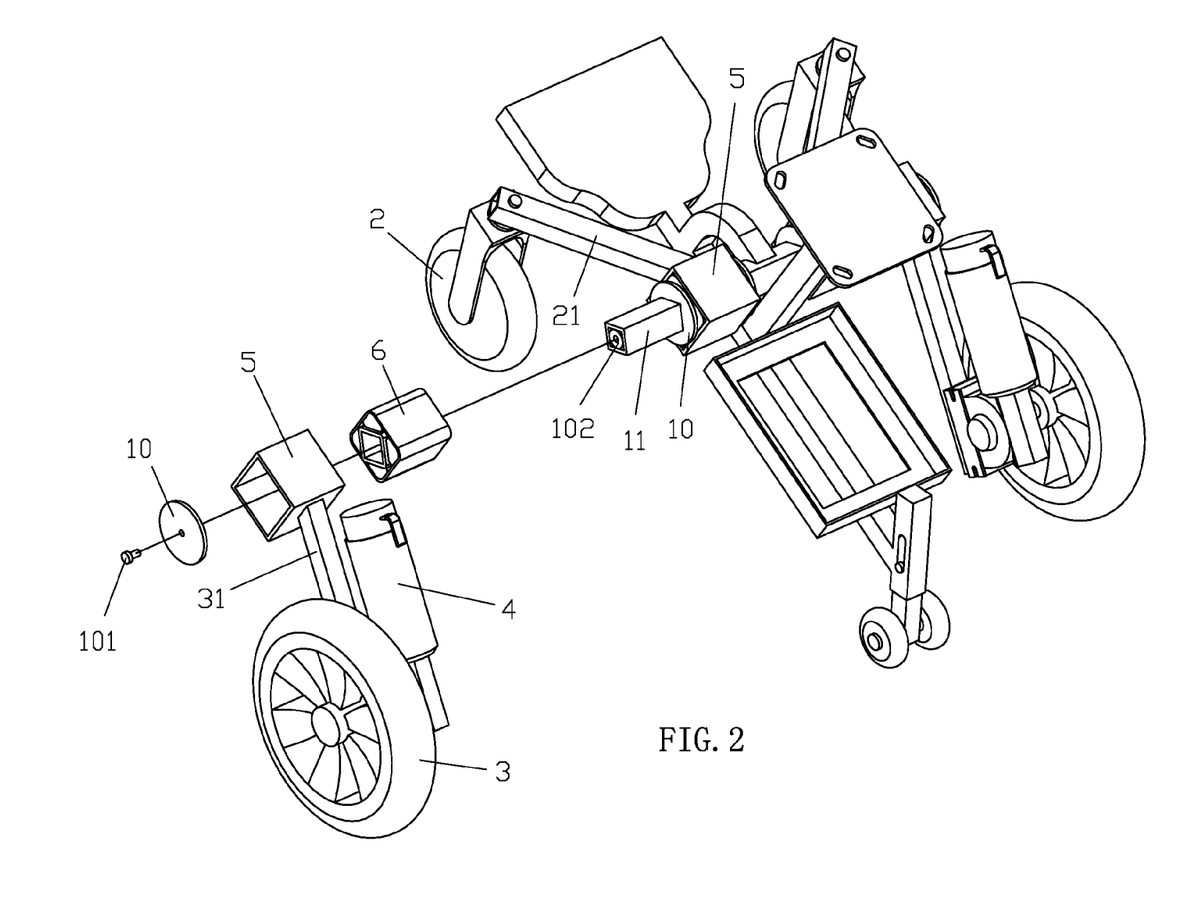
FIG. 2 is an exploded view of the four-wheel independent suspension system for the electric wheelchair in accordance with the present invention.
Figure 3:
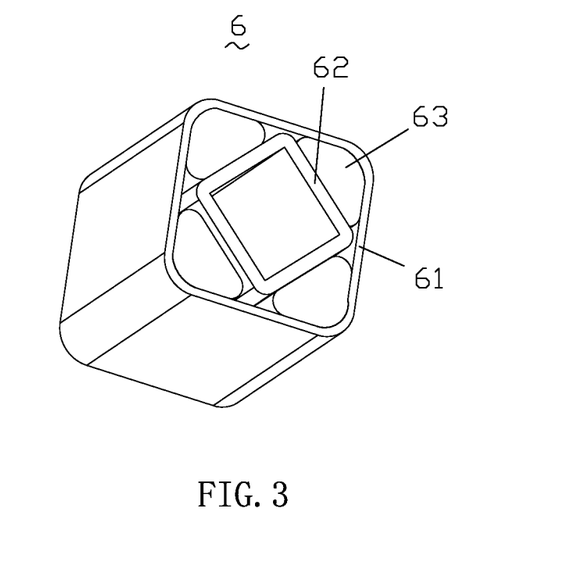
FIG. 3 shows a shock absorber of the four-wheel independent suspension system for the electric wheelchair in accordance with the present invention.
Figure 4:
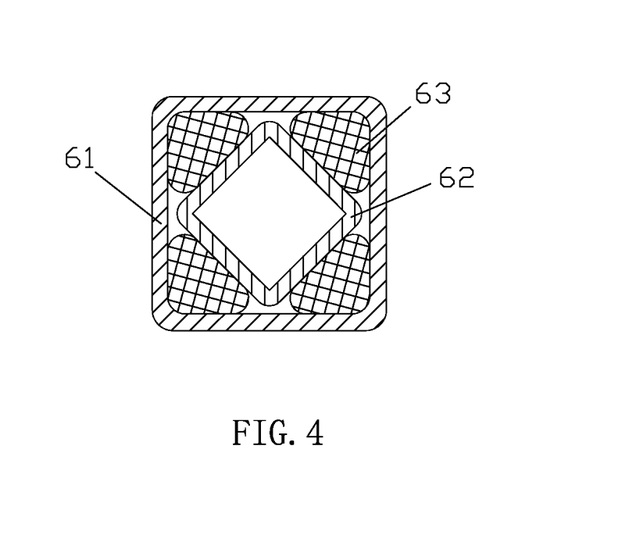
FIG. 4 is a cross sectional view of the shock absorber of the four-wheel independent suspension system for the electric wheelchair in accordance with the present invention.
Figure 5:
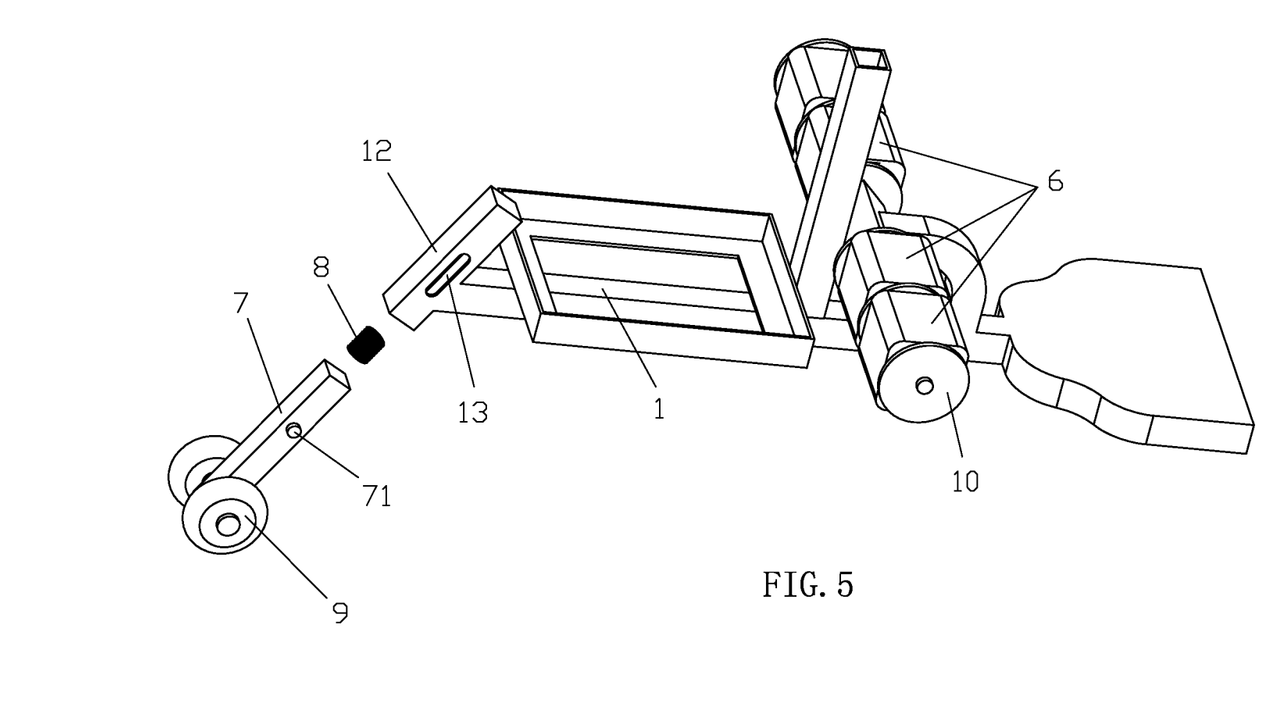
FIG. 5 is an exploded view of a part of the four-wheel independent suspension system for the electric wheelchair in accordance with the present invention.
Figure 7:
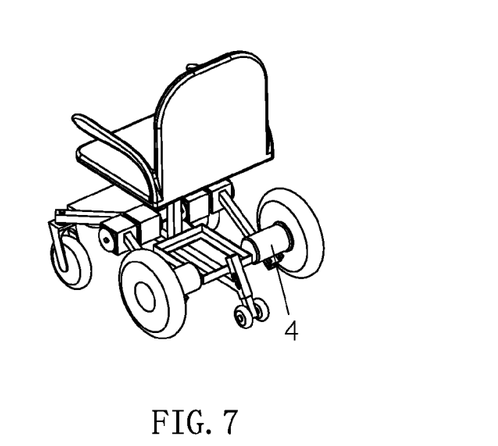
FIG. 7 shows that the electric motor of the present invention is provided with no electromagnetic brake, and the clutch is located behind the motor.
Figure 8:
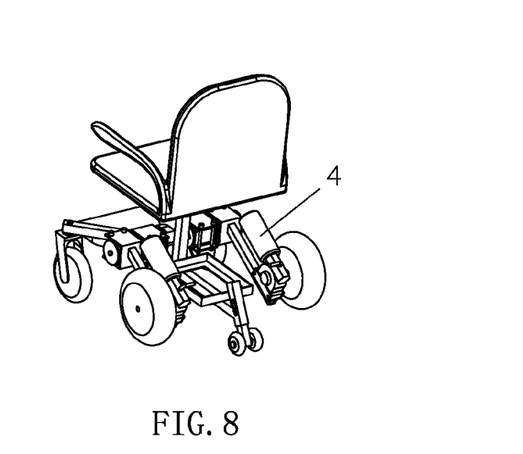
FIG. 8 shows that each of the rear rods of the chassis of the present invention is provided with a hub motor.
Figure 9:
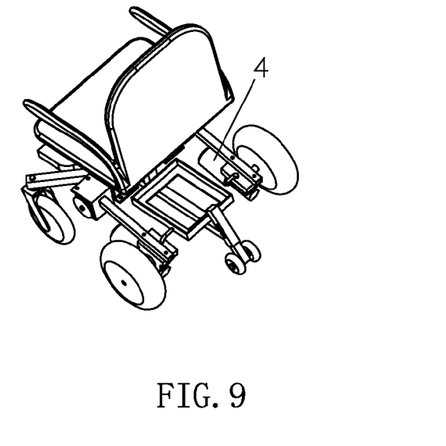
FIG. 9 shows that the hub motor of the present invention is disposed at a position different from FIG. 8.
Figure 10:
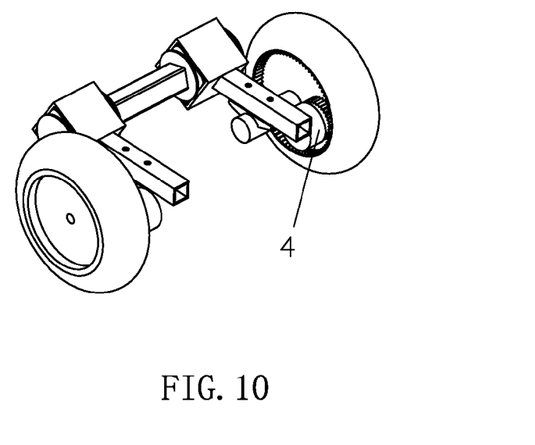
FIG. 10 shows that the motor for driving the electric wheelchair of the present invention is a motor gear.
Figure 12:
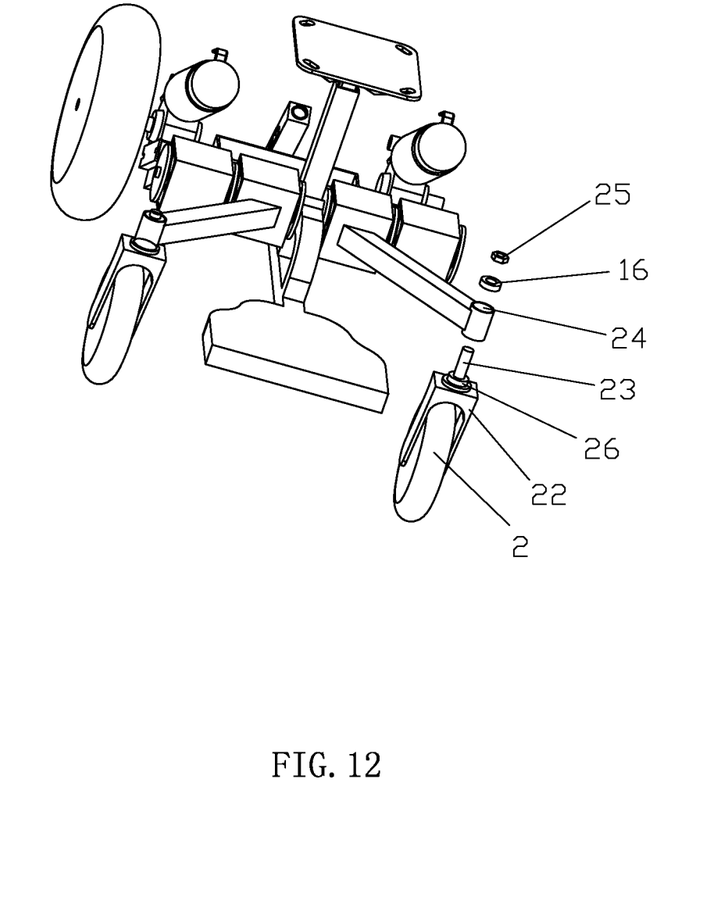
FIG. 12 is an exploded view of the front-wheel independent suspension system in accordance with the present invention.

Referring to FIGS. 1-12, a four-wheel independent suspension system for an electric wheelchair in accordance with the present invention comprises: a chassis 1, two front wheels 2 each fixed to a front rod 21 respectively, and two rear wheels 3 fixed to a rear rod 31 respectively. Each of the front wheels 2 is connected to the front rod 21 via a connecting rod 22, as shown in FIG. 12. The connecting rod 22 is provided at the top end with a threaded portion 23 which is inserted through a hole 24 of the front rod 21 and screwed with a nut 25, and between the inner surface of the hole 24 and the threaded portion 23 is disposed a bearing 26 to reduce rotation friction. Each of the rear rods 31 is provided with an electric motor 4 which is equipped with an electromagnetic brake, and the clutch is located in front of the electric motor, as shown in FIG. 1, or as shown in FIG. 7, the electric motor 4 is provided with no electromagnetic brake, and the clutch is located behind the electric motor 4. Or, as shown in FIG. 8, each of the rear rods 31 is provided with a hub motor, and different motors can be assembled in different ways, such as shown in FIG. 9. Or, the electric motor 4 can be a motor gear as shown in FIG. 10. The two rear wheels 3 of the electric wheelchair can have different rotation speeds by controlling the rotation speed of the electric motors, so that the wheelchair can make turns. The chassis 1 is provided with a rail 11 extending in a width direction of the chassis 1. Each of the front rods 21 and rear rods 31 has one end connected to a first connecting sleeve 5 which is square-shaped in cross section and welded to or integral with the front or rear rods 21, 31. In each of the first connecting sleeves 5 is disposed a first shock absorber 6 which includes a rectangular outer pipe 61, and a rectangular inner pipe 62 disposed in and rotated 45 degrees with respect to the outer pipe 61, so that the edges of the inner pipe 62 are abutted against the inner surface of the outer pipe 61. Between each of the edges of the inner pipe 62 and the inner space of the outer pipe 61 is disposed an elastic rubber 63. The inner pipe 62 of each of the first shock absorbers 6 is sleeved on the rail 11. At both ends of the respective first shock absorbers 6 are provided a positioning piece 10, in such a manner that the inner most positioning pieces 10 are welded to the rail 11, the positioning pieces 10 located between the first shock absorbers 6 are sleeved onto the rail 11, and the outer most positioning pieces 10 are fixed by bolts 101 which are screwed with the fixing members 102 welded inside the rail 11, so that the front and rear wheels 2, 3 are independently suspended from the chassis 1 via the connecting sleeves and the first shock absorbers 6.

Figure 6:
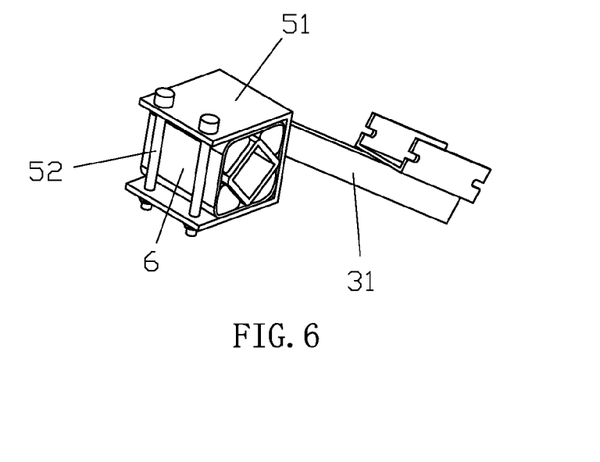
FIG. 6 shows that the connecting sleeve of the present invention is consisted of a U-shaped frame and bolts.

In this embodiment, each of the first connecting sleeves 5 can be an integral rectangular structure, or can be consisted of a U-shaped frame 51 and bolts 52. The U-shaped frame 51 is sleeved on a corresponding first shock absorber 6 and then fixed by bolts 52 and nuts 53, preferably, by two bolts 52. The structure of this first connecting sleeve 5 makes it easier for the first connecting sleeve 5 to be assembled onto the first shock absorber 6.

In this embodiment, the front rods 21 are connected to the first shock absorbers 6 on the inside and extend outward and forward in an inclined manner, and the rear rods 31 are connected to the first shock absorbers 6 on the outside and extend downward and backward in an inclined manner. Herein the "on the inside" "on the outside" are relative terms referring to the width direction of the electric wheelchair, and the "forward" refers to the forward or front direction of the wheelchair. The abovementioned arrangements make it easy to install a decelerator 4.

The chassis 1 of this embodiment preferably further includes a safety rod 7. At the rear end of the chassis 1 is disposed a hollow pipe 12 which extends downward and backward. The hollow pipe 12 has a top close end. Inside the hollow pipe 12 is disposed an elastic member 8, the safety rod 7 is partially inserted in the hollow pipe 12 and abutted against the elastic member 8, and the elastic member 8 has a top end pressed against the top close end of the hollow pipe 12 and a lower end pressed against the safety rod 7. The elastic member 8 is preferably a spring or elastic rubber. The safety rod 7 prevents the electric wheelchair from tipping backwards. When hitting the road surface, the safety rod 7 will bounce back due to the arrangement of the elastic member 8, so as to reduce shock transmitted to the seat, and protect the safety rod 7 from rupture or wear off.

In this embodiment, the safety rod 7 is provided at the lower end thereof with two first wheels 9 which are located at two sides of the safety rod 7, the arrangement of the first wheels 9 further protects the safety rod 7 and are also conducive to shock absorption.

In this embodiment, the hollow pipe 12 is provided with two aligned slots 13 in two opposite sides thereof, the safety rod 7 is provided with an engaging protrusion 71 on each of two opposite sides, and the engaging protrusions 71 are engaged in the slots 13, so that the slots 13 absorb the displacement of the safety rod 7 when the safety rod 7 hits the road surface, and also prevent the safety rod 7 from falling off of the hollow pipe 12.

Figure 11:
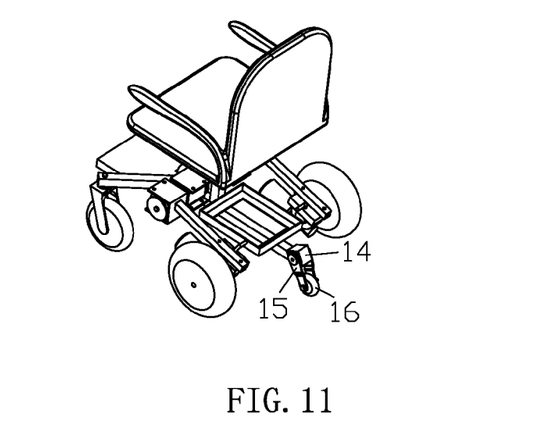
FIG. 11 shows that at the rear end of the chassis is provided a second connecting sleeve, and at two ends of the inner pipe of the second shock absorber are sleeved two suspension arms.

The anti-tipping safety device disposed at the rear end of the chassis can also take the following forms: at the rear end of the chassis 1 is provided a second connecting sleeve 14 in which being disposed a second shock absorber (not shown) which is structurally the same as the first shock absorber 6. At two ends of the inner pipe of the second shock absorber are sleeved two suspension arms 15, and at the lower ends of the suspension arms 15 is fixed a second wheel 16. In addition to the anti-tipping function, this anti-tipping safety device provides better shock absorption as compared to the spring shock absorber.

With the first connecting sleeves 5 and the first shock absorbers 6, each of the rear wheels 3 can be independently suspended from the chassis 1, unlike the conventional suspension, in which springs are disposed between the seat and the chassis 1. When the rear wheels 3 run on a pump road surface, the first shock absorbers 6 will bounce up and down together with the rear wheels 3 to reduce shock transmission between the rear wheels 3 and the chassis 1, preventing shock from being transmitted to the seat via the chassis 1, so that the user on the seat will feel less shock. Besides, the structure of the first shock absorbers 6 can produce shock absorbing effect in all directions, unlike the springs that produce shock absorbing effect only in the vertical direction. The first shock absorbers 6 also take much less space than the springs, which is conducive to miniaturization of the mobility scooter.

While we have shown and described various embodiments in accordance with the present invention, it is clear to those skilled in the art that further embodiments may be made without departing from the scope of the present invention.

What is claimed is:

1. A four-wheel independent suspension system for an electric wheelchair comprising: a chassis, two front wheels each fixed to a front rod respectively, and two rear wheels each fixed to a rear rod respectively; the four-wheel independent suspension system being characterized in that: the chassis is provided with a rail extending in a width direction of the chassis, each of the front rods and rear rods has one end connected to a first connecting sleeve which is square-shaped in cross section, in each of the first connecting sleeves is disposed a first shock absorber which includes a rectangular outer pipe, and a rectangular inner pipe disposed in and rotated degrees with respect to the outer pipe, so that edges of the inner pipe are abutted against the inner surface of the outer pipe, between each of the edges of the inner pipe and the inner space of the outer pipe is disposed an elastic rubber, the inner pipe of each of the first shock absorbers is sleeved on the rail, so that the front and rear wheels are independently suspended from the chassis via the connecting sleeves and the first shock absorbers.

2. The four-wheel independent suspension system for the electric wheelchair as claimed in claim 1, wherein each of the first connecting sleeves includes a U-shaped frame and bolts, the U-shaped frame is sleeved on a corresponding one of the first shock absorbers and then fixed by the bolts and nuts.

3. The four-wheel independent suspension system for the electric wheelchair as claimed in claim 2, wherein the front rods are connected to the first shock absorbers that are disposed in the first connecting sleeves that are connected to the front rods and extend outward and forward in an inclined manner, and the rear rods are connected to the first shock absorbers that are disposed in the first connecting sleeves that are connected to the rear rods and extend downward and backward in an inclined manner.

4. The four-wheel independent suspension system for the electric wheelchair as claimed in claim 3 further comprising a safety rod, at a rear end of the chassis is disposed a hollow pipe which extends downward and backward, the hollow pipe has a top close end, inside the hollow pipe is disposed an elastic member, the safety rod is partially inserted in the hollow pipe and abutted against the elastic member.

5. The four-wheel independent suspension system for the electric wheelchair as claimed in claim 4, wherein the hollow pipe is provided with two aligned slots in two opposite sides thereof, the safety rod is provided with an engaging protrusion on each of two opposite sides, and the engaging protrusions are engaged in the slots.

6. The four-wheel independent suspension system for the electric wheelchair as claimed in claim 4, wherein the elastic members are springs.

7. The four-wheel independent suspension system for the electric wheelchair as claimed in claim 4, wherein the safety rod is provided at a lower end thereof with two first wheels which are located at two sides of the safety rod.

8. The four-wheel independent suspension system for the electric wheelchair as claimed in claim 3, wherein a second connecting sleeve is disposed at the rear end of the chassis, and in the second connecting sleeve is disposed a second shock absorber which is structurally the same as the first shock absorber, at two ends of an inner pipe of the second shock absorber are sleeved two suspension arms, and at lower ends of the suspension arms is fixed a second wheel.

9. The four-wheel independent suspension system for the electric wheelchair as claimed in claim 1, wherein the front rods are connected to the first shock absorbers that are disposed in the first connecting sleeves that are connected to the front rods and extend outward and forward in an inclined manner, and the rear rods are connected to the first shock absorbers that are disposed in the first connecting sleeves that are connected to the rear rods and extend downward and backward in an inclined manner.

10. The four-wheel independent suspension system for the electric wheelchair as claimed in claim 9 further comprising a safety rod, at a rear end of the chassis is disposed a hollow pipe which extends downward and backward, the hollow pipe has a top close end, inside the hollow pipe is disposed an elastic member, the safety rod is partially inserted in the hollow pipe and abutted against the elastic member.

11. The four-wheel independent suspension system for the electric wheelchair as claimed in claim 10, wherein the hollow pipe is provided with two aligned slots in two opposite sides thereof, the safety rod is provided with an engaging protrusion on each of two opposite sides, and the engaging protrusions are engaged in the slots.

12. The four-wheel independent suspension system for the electric wheelchair as claimed in claim 10, wherein the elastic members are springs.

13. The four-wheel independent suspension system for the electric wheelchair as claimed in claim 10, wherein the safety rod is provided at a lower end thereof with two first wheels which are located at two sides of the safety rod.

14. The four-wheel independent suspension system for the electric wheelchair as claimed in claim 9, wherein a second connecting sleeve is disposed at the rear end of the chassis, and in the second connecting sleeve is disposed a second shock absorber which is structurally the same as the first shock absorber, at two ends of an inner pipe of the second shock absorber are sleeved two suspension arms, and at lower ends of the suspension arms is fixed a second wheel.

* * * * *